US006940493B2

(12) United States Patent
Blumberg et al.

(10) Patent No.: US 6,940,493 B2
(45) Date of Patent: Sep. 6, 2005

(54) SOCIALIZING REMOTE COMMUNICATION

(75) Inventors: Bruce Blumberg, Concord, MA (US); Angela Chang, Cambridge, MA (US); Hiroshi Ishii, Boston, MA (US); Brad Koerner, Boston, MA (US); Benjamin Resner, Roxbury, MA (US); XingChen Wang, Somerville, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 458 days.

(21) Appl. No.: 10/112,246

(22) Filed: Mar. 29, 2002

(65) Prior Publication Data

US 2003/0184498 A1 Oct. 2, 2003

(51) Int. Cl.[7] .................................................. G09G 5/00
(52) U.S. Cl. ..................... 345/173; 345/156; 345/168; 341/20; 348/152; 348/154; 348/155; 382/100; 382/106; 382/107
(58) Field of Search ................................. 345/156, 168, 345/173; 341/20; 348/152, 154, 155; 382/100, 106, 107

(56) References Cited

U.S. PATENT DOCUMENTS

| 4,968,877 | A | * | 11/1990 | McAvinney et al. ......... 250/221 |
|---|---|---|---|---|
| 5,557,724 | A | | 9/1996 | Sampat et al. ............... 395/157 |
| 5,634,710 | A | | 6/1997 | Di Russo et al. ............ 362/100 |
| 5,996,383 | A | | 12/1999 | Adelmeyer et al. ............ 70/454 |
| 6,049,034 | A | * | 4/2000 | Cook ........................... 84/736 |
| 6,049,281 | A | * | 4/2000 | Osterweil ................. 340/573.4 |
| 6,222,465 | B1 | * | 4/2001 | Kumar et al. .................. 341/20 |
| 6,300,923 | B1 | | 10/2001 | Havel ........................... 345/83 |
| 6,304,254 | B1 | | 10/2001 | Johnson et al. ............. 345/204 |
| 6,305,602 | B1 | | 10/2001 | Grabowski et al. .......... 235/379 |
| 6,305,814 | B1 | | 10/2001 | Giamas ....................... 362/100 |
| 6,318,027 | B1 | | 11/2001 | Richardson et al. ........... 49/504 |
| 6,321,476 | B2 | | 11/2001 | Parini ........................... 40/725 |
| 6,332,202 | B1 | | 12/2001 | Sheikh et al. .................. 714/39 |
| 2001/0014441 | A1 | * | 8/2001 | Hill et al. .................... 434/236 |
| 2003/0132974 | A1 | * | 7/2003 | Bodin ......................... 345/863 |

OTHER PUBLICATIONS

Buchenau et al., "Experience Prototyping," *Symposium on Designing Interactive Systems* 424–433 (2000).
Moggridge, "Expressing Experiences in Design," *Interactions* 17–24 (Jul. + Aug. 1999).

* cited by examiner

*Primary Examiner*—Bipin Shalwala
*Assistant Examiner*—Vincent E. Kovalick

(57) ABSTRACT

Remote, non-verbal interpersonal communication is facilitated between communication stations located remotely from each other. A first communication station registers proximity of a user thereto and communicates to a second communication station a signal indicative of the registered proximity. The first communication station also registers a physical gesture and communicates a signal indicative of the gesture to the second communication station. The second communication station, in turn, receives the signals and, in response thereto, produces a visual output indicative of proximity and of the gestural input.

17 Claims, 3 Drawing Sheets

SOCIALIZING REMOTE COMMUNICATION

FIELD OF THE INVENTION

The present invention relates to remote communications, and in particular to communication of emotion.

BACKGROUND OF THE INVENTION

Although the modalities and convenience of remote communication have increased dramatically in recent years, it can be argued that progress in connecting people electronically has actually driven them further apart—at least in a human sense. E-mail, for example, is pure text, lacking the nuance and expression of spoken communication. It is for this reason that e-mail messages are frequently accompanied by so-called "emoticons" (or "smilies"), which convey an intended sentiment that bare words may lack. Indeed, even a telephone conversation, which affords the subtleties of intonation, pause and non-verbal responses such as laughter, cannot impart the emotional content of gesture.

At the same time, communication modalities (such as the telephone) that permit emotional expression necessarily rely on real-time interaction, and the communication link requires substantial bandwidth and active effort to initiate. Both parties to a phone conversation must be simultaneously available and, if feelings are to be exchanged, sufficiently unoccupied to express those feelings. A voice-mail message may carry emotion, but is always received some time after the message is imparted.

DESCRIPTION OF THE INVENTION

BRIEF SUMMARY OF THE INVENTION

The present invention facilitates intimate communication of emotional content without a high-bandwidth connection or the active participation of the receiving party. Moreover, emotional content is both imparted and reproduced in a sub-verbal form more akin to direct, gestural expression of sentiment than an exchange of words. For example, an expression may be imparted haptically, i.e., via touch, at one station and displayed visually (e.g., as a light signal) at one or more remotely located stations. The haptic sensor may register different intensity levels of touch, which intuitively correspond to different levels of emotional expression. The visual sensor, in turn, may reproduce different haptic messages through variations in brightness or signal duration. Again, both the creation of the message and its reproduction occur on an intuitive, sub-verbal level.

Desirably, the invention also senses the proximity of the user and transmits an indication of sensed proximity to one or more remotely located stations. Proximity may be indicated, at the remote station(s), by a second distinct visual signal. Visual indication of human proximity to a remotely located station provides several advantages. First, it represents a non-interruptive cue indicating that another person is near the remote station, which may itself convey psychic value; thus, a loved one's presence may be sensed without effort on the part of the sensed individual or interruption of the activities of the person(s) observing the visual signal. Second, it can act as a gating signal indicating when a gestural message is appropriate—i.e., when the other person is available to receive it.

Accordingly, in a first aspect, the invention comprises a communication station for facilitating remote, non-verbal interpersonal communication. The station may comprise a proximity sensor; one or more sensors for registering a physical gesture; a communication interface; a processor; and a display. The communication interface transmits signals indicative of proximity and the registered gesture to one or more remote stations, and also receiviies signals from the remote stations indicative at least of proximity and, possibly, gestures as well. The processor generates, for transmission by the communication interface, signals indicative of proximity and the registered gesture, and converts received signals into output signals. The display responds to the output signals by producing a visual output corresponding to to the received signals.

The sensors are typically analog sensors, and the communication interface is configured to communicate via a real-time link, e.g., the Internet. The display may produce a visual feedback signal in response to the registered physical gesture, representing, to the user, the signal that is being transmitted to a remote station. The stations may be in the form, for example, of a picture frame, each which may contain a photographic representation of the person at the other station.

In a second aspect, the invention comprises a method of facilitating remote, non-verbal interpersonal communication. In accordance with the method, at least first and second communication stations located remotely from each other are provided. The first communication station registers the proximity of a user and communicates to the second communication station a signal indicative of the registered proximity. The first communication station also registers a physical gesture and communicates a signal indicative of the gesture to the second communication station. The second communication station, in turn, receives the signals and, in response, produces a visual output indicative of proximity and of the gestural input.

BRIEF DESCRIPTION OF THE DRAWINGS

The foregoing discussion will be understood more readily from the following detailed description of the invention, when taken in conjunction with the accompanying drawings, in which.

DETAILED DESCRIPTION OF THE PREFERRED EMBODIMENTS

Figure 1:
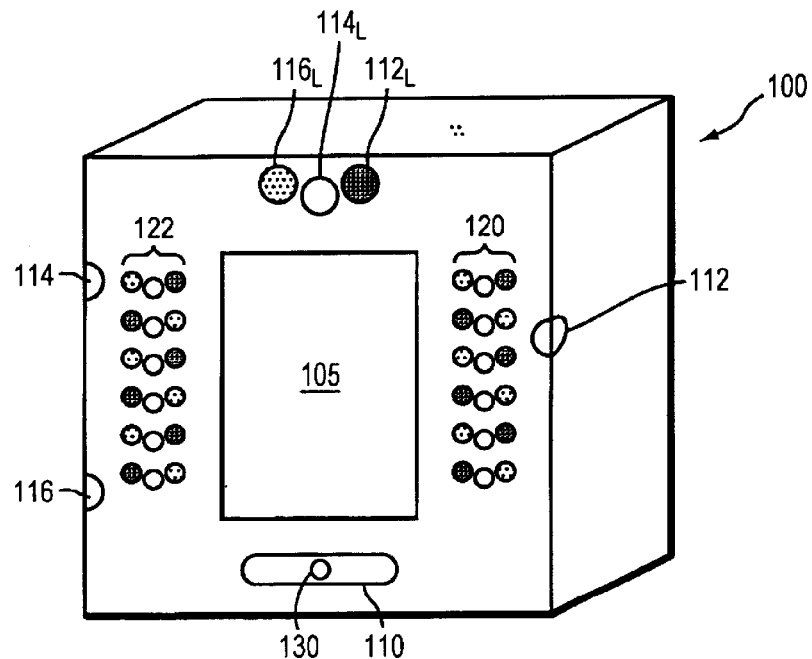
FIG. 1 is a perspective view of a representative embodiment of the invention.

With reference to FIG. 1, an embodiment 100 of the invention is shaped generally as a picture frame, with a central window 105 for receiving a photographic image (typically of the user of a remotely located station 100). Station 100 receives inputs from a proximity sensor 110 and a series of touch sensors 112, 114, 116. Station 100 provides outputs indicative of signals received from remote, similarly configured stations via a series of displays. A pair of touch displays 120, 122 each includes three sets of differently colored lights (typically light-emitting diodes, or LEDs). Each LED color corresponds to a different one of the touch sensors on the remote station, and the differently colored LEDs are distributed evenly throughout displays 120, 122. A proximity display 130 indicates the approach of a user to the remote station.

The station 100 also includes a series of feedback LEDs 112$_L$, 114$_L$, 116$_L$. These are operatively responsive to the user's manipulation of the corresponding touch sensors 112, 114, 116. In this way, the user of station 100 obtains a sense, in real time, of the visual effect that his or her manipulation of the touch sensors will produce on the remote station.

Figure 2:
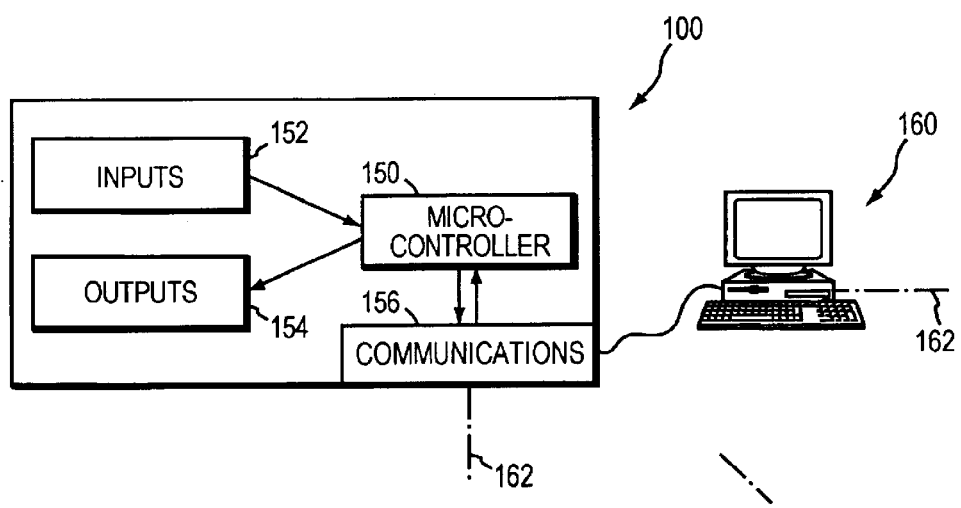
FIG. 2 schematically illustrates the functional modules of the embodiment shown in FIG. 1, and their interrelationship.

FIG. 2 conceptually illustrates the primary operational components of station 100 and their organization. A microcontroller 150 receives signals from inputs generically indicated at 152—i.e., proximity signals from proximity sensor 110, and force signals from touch sensors 112, 114, 116. Microcontroller 150 also controls the device outputs, generically indicated at 154. In the case of feedback LEDs 112$_L$, 114$_L$, 116$_L$, these are operated based on the user's handling of the corresponding touch sensors. Control of touch displays 120, 122 depends on signals received from external sources.

Transmission and reception of signals to and from similarly configured stations 100 occurs by means of a communications interface 156. This may itself be connected to an external device 160, which is shown as a computer but may also be a mobile phone, personal digital assistant, or other device connected to a real-time communications link 162, such as the Internet or other computer network (e.g., a local-area network, a wide-area network, etc.). Alternatively, communications interface 156 may be directly connected to communications link 162.

In operation, when the user approaches station 100, proximity sensor 110 registers the user's presence, producing an electrical signal that increases in amplitude as the user draws closer. In response, microcontroller 150 may initiate communication (via interface 156 and link 162) with one or more remotely located stations 100. (Alternatively, communication between stations can be more or less continuous, depending on the availability of communication bandwidth.) Microcontroller 150 generates a signal that causes illumination of LED 130 on the remote station. Desirably, the signal varies over time to indicate the change in sensed proximity, which may be translated, at the remote station 100, into a brightness variation of LED 130. Accordingly, communication link 162 is ideally a real-time link in the sense that user actions at one station are communicated to and received by a remote station without significant delay.

Perceiving the visual proximity cue from LED 130, a user of station 100, recognizing that the remote user has approached the remote station with which his own local station 100 is in communication, may decide to send a non-verbal, gesture-based message to the remote user by applying pressure to one or more of touch sensors 112, 114, 116. The number of touch sensors the user decides to squeeze determines the LED colors in displays 120, 122 that will be illuminated in the remote station. The force applied by the user to each of the touch sensors 112, 114, 116 is translated into an intensity value, which is communicated to the remote station. This value, in turn, is utilized by the microcontroller 150 of the remote station to control the intensity, number and/or illumination duration of the LEDs illuminated in displays 120, 122 and corresponding to the squeezed touch sensor. Microcontroller 150 may also be configured to sense the duration of force application to a touch sensor and to assign an intensity value to this value as well as the magnitude of applied force. Again, feedback displays 112$_L$, 114$_L$, 116$_L$ give the sending user a sense of the visual signal that will be reproduced at the remote station.

It should be understood that numerous variations on the foregoing design are possible. For example, station 100 can be equipped to register gestures other than applied pressure. Such gestures can involve, for example, manipulation of a joystick or other input device, blowing (see, e.g., Buchenau et al., "Experience Prototyping," *Symposium on Designing Interactive Systems* 424–433 (2000)), or even eye contact as recognized and recorded by a digital camera. Touch is a preferred gesture, however, because of its intuitive emotional expressiveness.

Figure 3A:
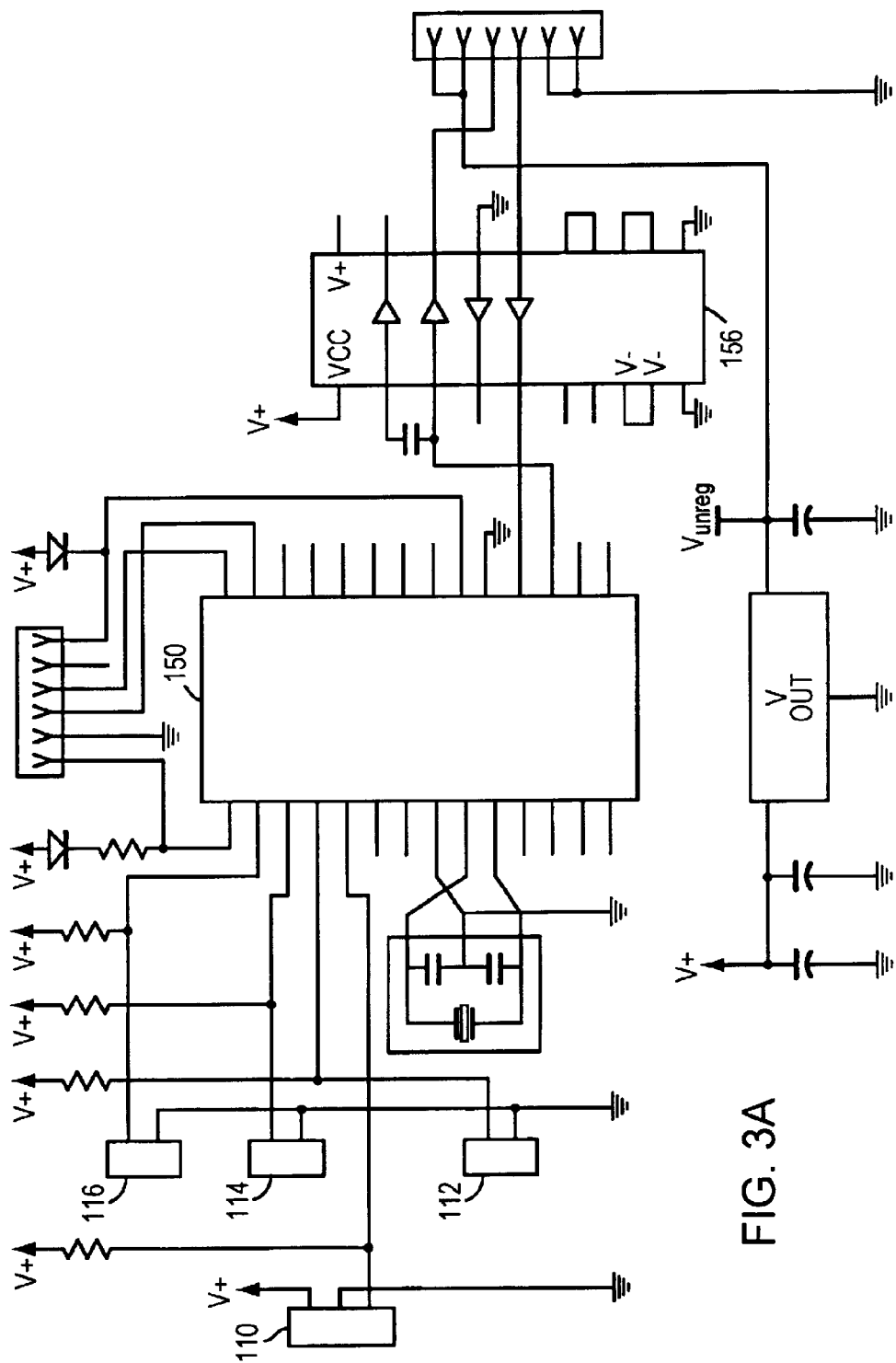
FIGS. 3A, 3B are a circuit schematic of a working embodiment of the invention. The various elements may not be drawn to scale.
Figure 3B:
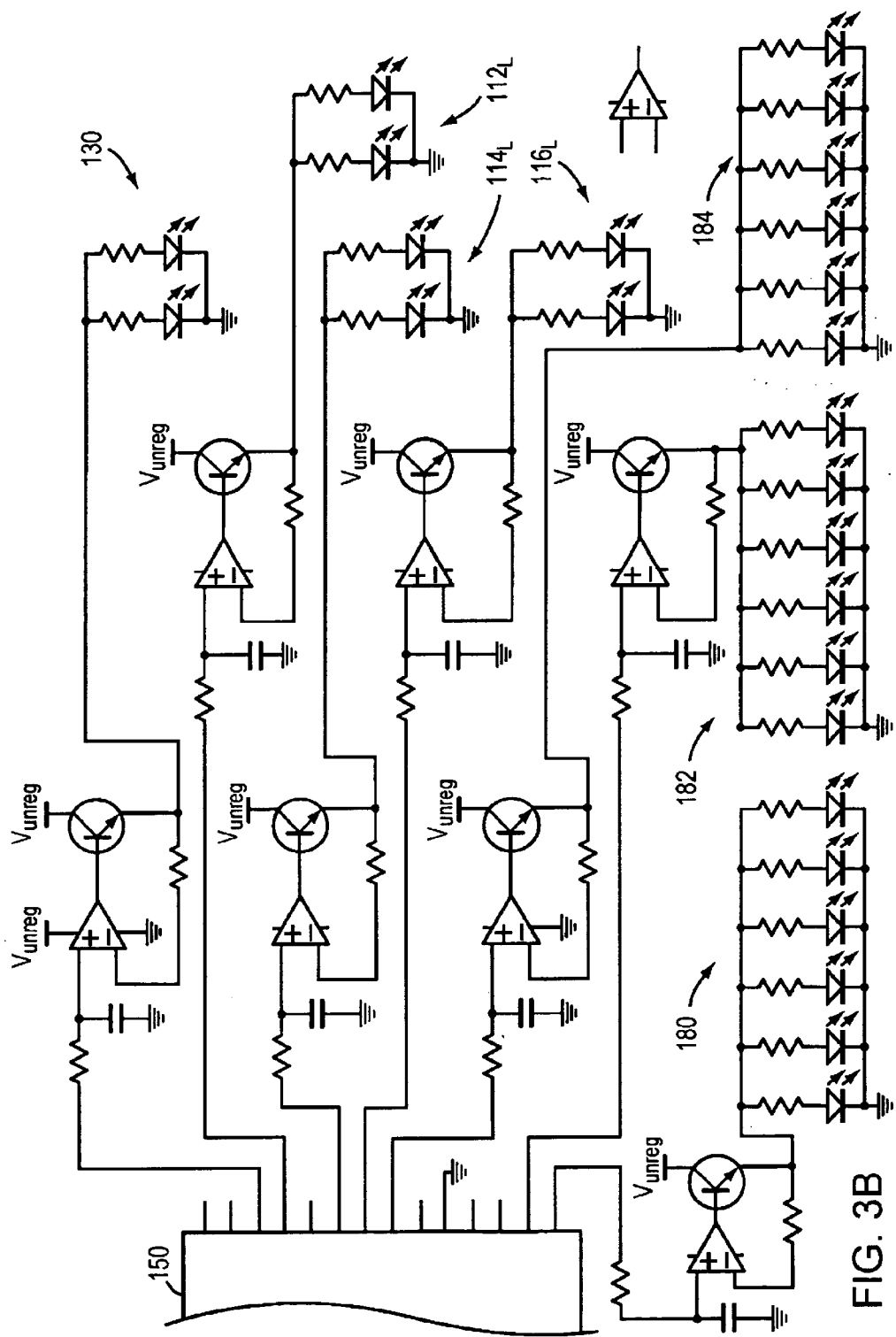

FIGS. 3A, 3B illustrate a representative circuit for the device shown in FIGS. 1 and 2. Preferably, the sensors are analog sensor capable of registering continuously variable levels of the sensed phenomena. Thus, proximity sensor 110 is implemented as a conventional infrared sensor, which produces a signal proportional to detected heat. Touch sensors 112, 114, 116 are implemented as force-sensitive resistors, which are preferred for ease of implementation and sensitivity. The voltage drop from V+ caused by the force-sensitive resistors 112, 114, 116 in combination with the respective series resistors is measured by microcontroller 150 and interpreted as a force magnitude.

Communications interface 156 is implemented as a standard RS-232 port, as shown. Intensity values for the input sensors 110, 112, 114, 116 may be communicated by pulse-width modulation (PWM) for reasons discussed below.

Each of the LED clusters 180, 182, 184 corresponds to a set of diodes of a particular color distributed through one of the displays 120, 122; in fact, although not shown in the schematic, there are actually twelve, not six LEDs in each cluster, the remaining six LEDs being distributed through the other of the displays 120, 122. Each of the displays is operated by a corresponding driver circuit that includes a low-pass filter and an amplifying transistor. The driver circuits allow the LEDs to be driven directly by the PWM signal, which is either generated by microcontroller 150 (in the case of LEDs 112$_L$, 114$_L$, 116$_L$) or received from a remote station (in the case of LEDs 130, 180, 182, 184) and provided to the appropriate driver circuit to produce a smooth, continuous visual signal. As a result, the incoming signals need not be processed or interpreted by microcontroller 150, but instead only directed to the proper driver circuits without modification.

Although the present invention has been described with reference to specific details, it is not intended that such details should be regarded as limitations upon the scope of the invention, except as and to the extent that they are included in the accompanying claims.

What is claimed is:

1. A method of facilitating remote, non-verbal interpersonal communication, the method comprising the steps of:
    a. providing first and second communication stations located remotely from each other;
    b. causing the first communication station to register proximity of a user thereto and to communicate to the second communication station a signal indicative of the registered proximity;
    c. causing the first communication station to register a physical gesture and to communicate a signal indicative of the gesture to the second communication station; and
    d. causing the second communication station to receive the signals and, in response thereto, to produce a light signal indicative of proximity and of the gestural input.

2. The method of claim 1 wherein the first and second stations communicate via a real-time communications link.

3. The method of claim 2 wherein the gesture comprises a continuously variable intensity level, the light signal varying in at least one of brightness and duration in order to indicate the intensity level.

4. The method of claim 3 wherein the gesture is touch, the intensity level being determined by at least one of a touch duration and a touch force.

5. The method of claim 1 wherein the output is in the form of a light signal, a first color indicating the physical gesture and a second color indicating proximity.

6. The method of claim 1 further comprising the steps of:
   a. causing the second communication station to register a return gesture and to communicate a signal indicative of the return gesture to the first communication station; and
   b. causing the first communication station to receive the signal and, in response thereto, to produce a visual output indicative of the return gesture.

7. The method of claim 1 further comprising the step of causing the second communication station to produce a visual feedback signal indicative of the return gesture.

8. A communication station for facilitating remote, non-verbal interpersonal communication, the station comprising:
   a. a proximity sensor;
   b. at least one sensor for registering a physical gesture;
   c. a communication interface for transmitting signals indicative of proximity and the registered gesture to a remote location and receiving signals from the remote location indicative at least of proximity;
   d. a processor for (i) generating, for transmission by the communication interface, signals indicative of proximity and the registered gesture, and (ii) converting the received signals into output signals; and
   e. a display, responsive to the output signals, for producing a light signal in response to the received signals.

9. The station of claim 8 wherein the sensors are analog sensors.

10. The station of claim 8 wherein the communication interface is configured to communicate via a real-time link.

11. The station of claim 10 wherein the link is the Internet.

12. The station of claim 8 wherein the display produces a variable light signal.

13. The station of claim 12 wherein the received signal indicates a gesture and an intensity level associated therewith, the light signal varying in at least one of brightness and duration in response to the indicated intensity level.

14. The station of claim 8 wherein the gesture sensor registers a continuously variable intensity level, the processor including data indicative of the intensity level in the gesture signal.

15. The station of claim 14 wherein the gesture sensor comprises a touch sensor, the intensity level being determined by at least one of a touch duration and a touch force.

16. The station of claim 8 wherein the display emits a first color indicating touch and a second color indicating proximity.

17. The station of claim 8 wherein the display produces a visual feedback signal in response to the registered physical gesture.

* * * * *